(12) United States Patent
Kobayashi et al.

(10) Patent No.: US 9,819,375 B2
(45) Date of Patent: Nov. 14, 2017

(54) WIRELESS MOBILE DEVICE AND TRANSMISSION METHOD

(71) Applicant: Panasonic Intellectual Property Corporation of America, Torrance, CA (US)

(72) Inventors: Yukari Kobayashi, Ishikawa (JP); Masayuki Hoshino, Kanagawa (JP); Hiroyuki Uejima, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/215,601

(22) Filed: Jul. 21, 2016

(65) Prior Publication Data

US 2017/0054840 A1 Feb. 23, 2017

(30) Foreign Application Priority Data

Aug. 20, 2015 (JP) .................................. 2015-163052

(51) Int. Cl.
*H04B 5/00* (2006.01)
*H04B 1/3827* (2015.01)
*H04M 1/725* (2006.01)

(52) U.S. Cl.
CPC .......... *H04B 1/3838* (2013.01); *H04B 1/385* (2013.01); *H04M 1/72569* (2013.01); *H04M 2250/06* (2013.01); *Y02B 60/50* (2013.01)

(58) Field of Classification Search
CPC ............... H04N 13/04; H04N 13/0066; H04N 13/0059; H04N 13/0048; H04B 1/3838; H04W 52/283
See application file for complete search history.

(56) References Cited

U.S. PATENT DOCUMENTS

| 2003/0062907 | A1* | 4/2003 | Nevermann | G01D 5/48 |
| | | | | 324/637 |
| 2009/0082060 | A1* | 3/2009 | Namatame | H04M 1/72519 |
| | | | | 455/552.1 |
| 2013/0028168 | A1 | 1/2013 | Hirai et al. | |
| 2016/0341436 | A1* | 11/2016 | Parker | H05B 37/029 |
| 2016/0373984 | A1* | 12/2016 | Hara | H04W 36/0083 |
| 2017/0054840 | A1* | 2/2017 | Kobayashi | H04B 1/385 |
| 2017/0187852 | A1* | 6/2017 | Baek | H04M 1/0264 |

FOREIGN PATENT DOCUMENTS

| JP | 2013-048400 | 3/2013 |
| WO | 2009/149023 | 12/2009 |

* cited by examiner

*Primary Examiner* — Edward Urban
*Assistant Examiner* — Max Mathew
(74) *Attorney, Agent, or Firm* — Seed IP Law Group LLP

(57) ABSTRACT

A wireless mobile device is used with the wireless mobile device mounted on a body of a user and includes a first wireless processor that performs wireless signal processing on a signal for a data communication in a first wireless system, a second wireless processor that performs wireless signal processing on a signal for a voice call in a second wireless system having a higher priority than a priority of the first wireless system, and a controller that, when a data communication in the first wireless system and a voice call in the second wireless system occurred at the same time, in a close-to-head state in which the wireless mobile device is brought close to a head of a user, reduces transmission power with which the first wireless processor outputs a transmission signal.

12 Claims, 8 Drawing Sheets

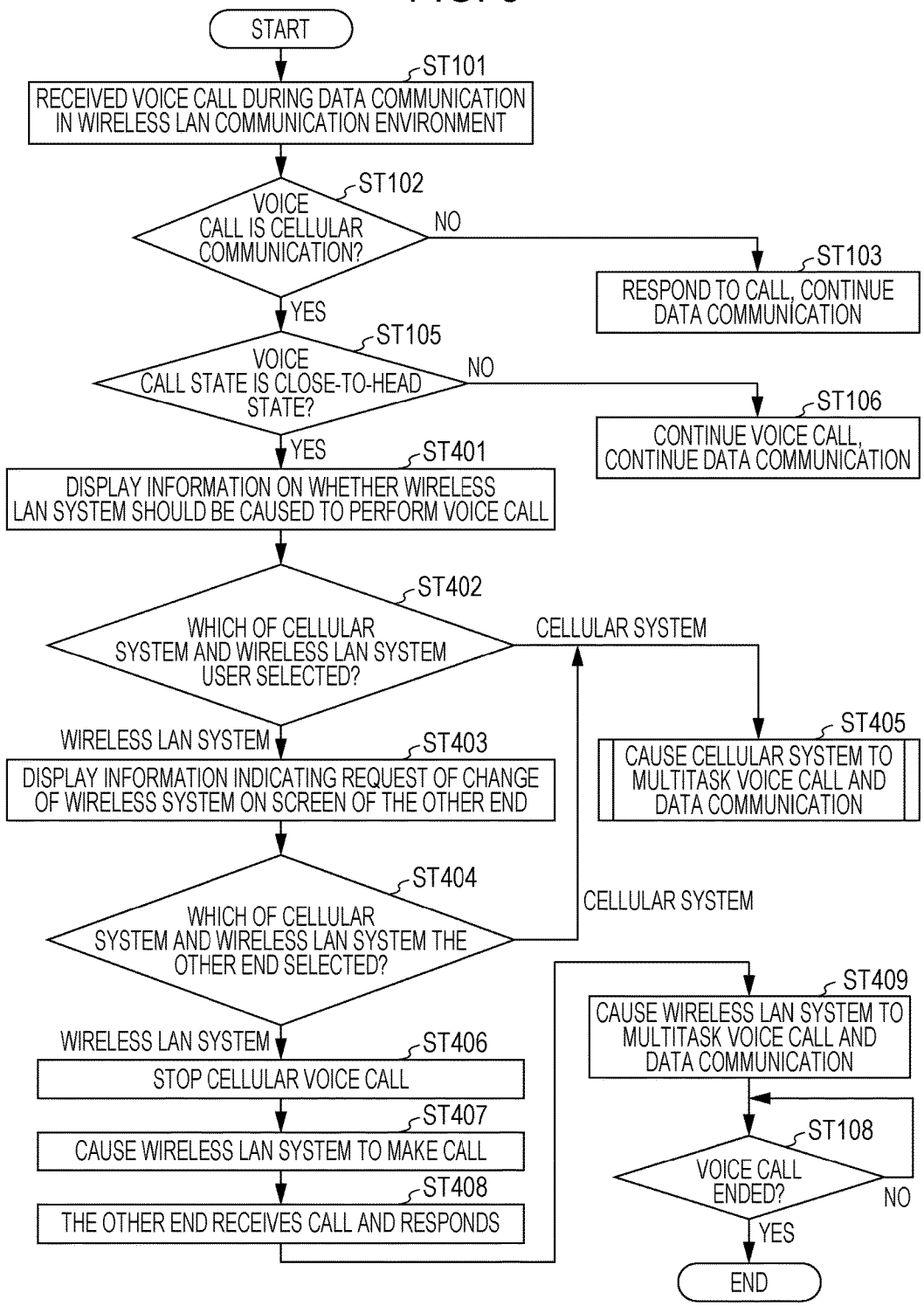

WIRELESS MOBILE DEVICE AND TRANSMISSION METHOD

BACKGROUND

1. Technical Field

The present disclosure relates to a wireless mobile device, such as a wearable device, and a transmission method.

2. Description of the Related Art

The use of smart devices typified by smartphones has rapidly spread in recent years. In particular, wearable devices are attracting attention as downsized, advanced smart devices. Watch-type terminals having a short-range wireless communication function and used in association with smart phones and wireless mobile terminals having a cellular communication function have already been commercialized.

Commercializing wearable devices requires downsizing antennas. However, downsizing a wearable device results in a size reduction of a circuit substrate included in the wearable device, an increase in the antenna current distribution density of the circuit substrate, and an increase in the specific absorption rate (SAR) value. Typically, it is difficult to reduce the SAR of a small terminal.

The SAR evaluation criterion and regulation value vary with the use state of the wireless mobile terminal. For watch-type terminals having a cellular communication function, conceivable use states thereof include a state in which the user is using a watch-type terminal with it mounted on his or her wrist, as well as a state in which the user is making a call with a terminal device brought close to his or her mouth or head. For this reason, there are two SAR evaluation criteria: a "wrist-worm" criterion assuming that the terminal is mounted on a wrist and a "mouth-worm" criterion assuming that the using is making a call with the terminal brought close to the mouth or head.

For example, the wrist-worm criterion requires that the SAR measured with the back of the terminal adhering to a phantom satisfy a regulation value of 4 W/kg averaged over 10 gram of tissue; the mouth-worm criterion requires that the SAR measured with the front of the terminal spaced from a phantom by 10 mm satisfy a regulation value of 1.6 W/kg averaged over 1 gram of tissue. That is, the mouth-worn regulation value is set to a more stringent value than that of the wrist-worn regulation value.

With regard to wireless mobile terminals having transmission functions of multiple wireless systems, there is also stipulated the SAR when simultaneously performing the transmission functions of the multiple wireless systems. For example, it is assumed that a watch-type terminal has a cellular communication function and a wireless local area network (LAN) communication function and that the user makes a voice call using the cellular communication function and simultaneously performs a data communication using the wireless LAN communication function.

In this case, the sum of the SAR when transmitting signals in the 2 GHz band using the cellular communication function and the SAR when transmitting signals in the 2.4 GHz band using the wireless LAN communication function must satisfy a regulation value. The SAR regulation value when simultaneously performing the transmission functions of multiple wireless systems is set to the same value as the regulation value when performing the transmission function of a single wireless system. As described above, the mouth-worn regulation value is 1.6 W/kg averaged over 1 gram of tissue. That is, the SAR characteristics when using multiple transmission functions are regulated more stringently than those when using a single transmission function.

Japanese Patent No. 5194171 discloses a method for improving the SAR characteristics when simultaneously performing the transmission functions of multiple wireless systems. The method includes determining whether a human body is present within a predetermined distance from a terminal and, if the human body is determined to be present within the predetermined distance from the terminal, reducing the transmission power (maximum allowable level). Japanese Unexamined Patent Application Publication No. 2013-48400 discloses a method of controlling the transmission power so that the SAR becomes equal to or smaller than a predetermined reference value.

SUMMARY

However, Japanese Patent No. 5194171 and Japanese Unexamined Patent Application Publication No. 2013-48400 must reduce the transmission power in order to reduce the SAR and therefore would result in a reduction in communication quality. Further, Japanese Unexamined Patent Application Publication No. 2013-48400 does not conceive any mouth-worn criterion.

One non-limiting and exemplary embodiment provides a wireless mobile device that when performing a communication with the device brought close to the mouth or head of the user, can improve SAR characteristics without reducing the communication quality, and a transmission method.

In one general aspect, the techniques disclosed here feature a wireless mobile device that is used with the wireless mobile device mounted on a body of a user. The wireless mobile device includes a first wireless processor that performs wireless signal processing on a signal for a data communication in a first wireless system, a second wireless processor that performs wireless signal processing on a signal for a voice call in a second wireless system having a higher priority than a priority of the first wireless system, and a controller that, when a data communication in the first wireless system and a voice call in the second wireless system occurred at the same time, in a close-to-head state in which the wireless mobile device is brought close to a head of a user, reduces transmission power with which the first wireless processor outputs a transmission signal.

It should be noted that general or specific embodiments may be implemented as a system, a method, an integrated circuit, a computer program, a storage medium, or any selective combination thereof.

According to the one aspect of the present disclosure, it is possible to, when performing a communication with the wireless mobile device brought close to the mouth or head of the user, improve SAR characteristics without reducing the communication quality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a flowchart showing the operation of a wireless mobile device according to a fourth embodiment.

DETAILED DESCRIPTION

Now, embodiments of one aspect of the present disclosure will be described in detail with reference to the accompanying drawings. However, the embodiments described below are illustrative only, and the present disclosure is not limited thereto.

First Embodiment

Configuration of Wireless Mobile Device 100

Figure 1:
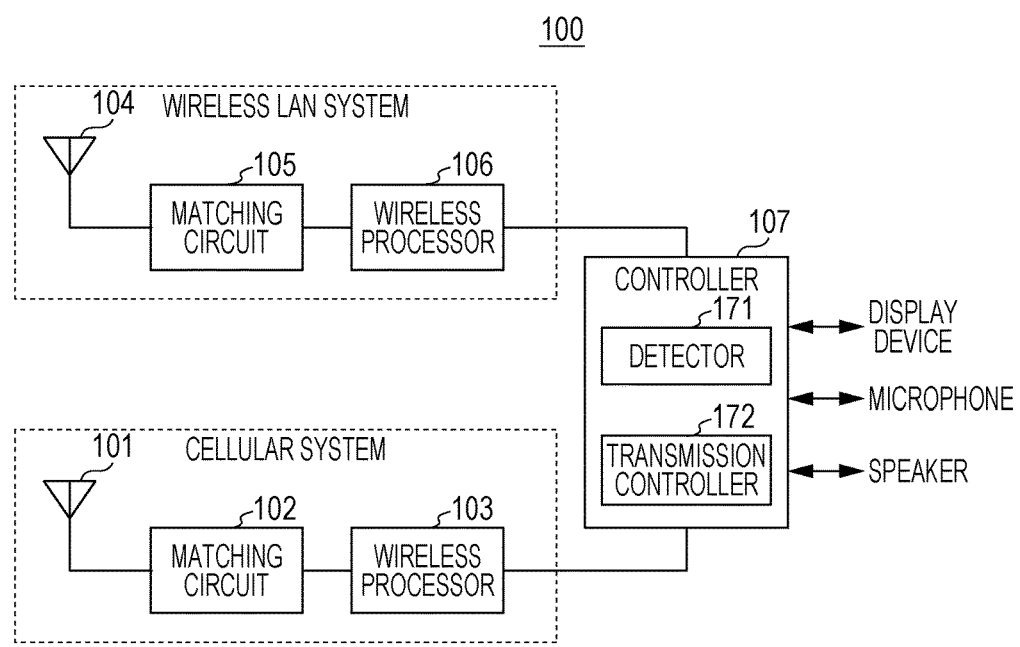
FIG. 1 is a block diagram showing an example configuration of a wireless mobile device according to a first embodiment.

FIG. 1 is a block diagram showing an example configuration of a wireless mobile device 100 according to the present embodiment.

Figure 2:
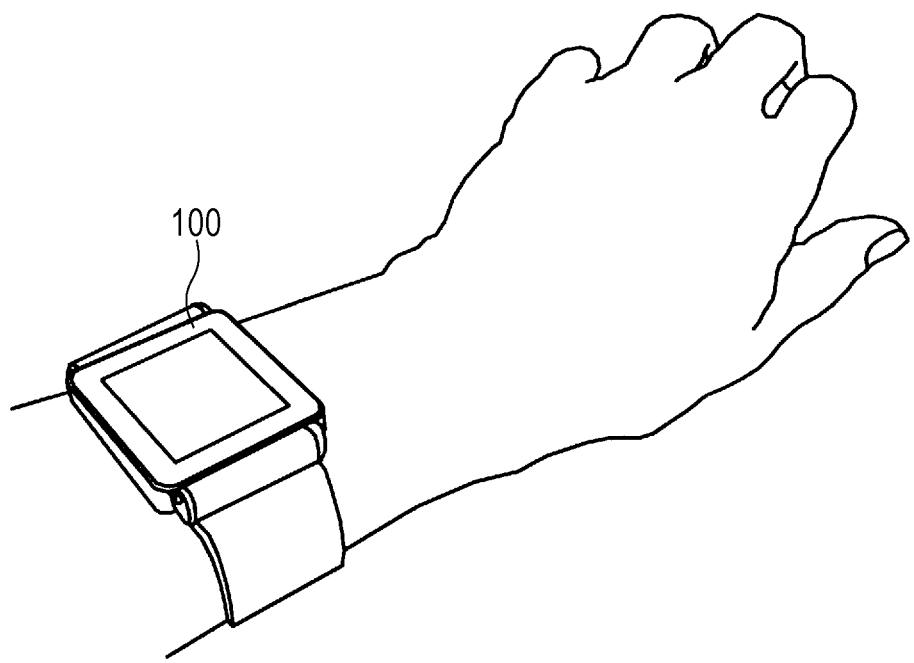
FIG. 2 is a diagram showing a state in which a watch-type terminal is mounted on a wrist.

The wireless mobile device 100 shown in FIG. 1 is, for example, a wearable wireless device, such as a watch-type terminal as shown in FIG. 2, which is used with it mounted on the body of the user.

The wireless mobile device 100 shown in FIG. 1 includes, for example, two wireless systems: a cellular system and a wireless LAN system (e.g., a WiFi® system).

In the present embodiment, it is assumed that priorities are assigned to the cellular system and wireless LAN system. In the present embodiment, there will be described an example in which the priority of the cellular system is higher than that of the wireless LAN system.

The wireless mobile device 100 shown in FIG. 1 includes an antenna 101, a matching circuit 102, a wireless processor 103, an antenna 104, a matching circuit 105, a wireless processor 106, and a controller 107. The antenna 101, matching circuit 102, wireless processor 103 constitute the cellular system, whereas the antenna 104, matching circuit 105, and wireless processor 106 constitute the wireless LAN system.

Through the antenna 101, the cellular system transmits and receives data communication (cellular communication) signals.

The matching circuit 102 is connected to the antenna 101 and wireless processor 103. The matching circuit 102 matches the impedance of the antenna 101 with the circuit impedance of the wireless processor 103, for example, in the 2 GHz band, which is a frequency band of cellular communications. Typically, the circuit impedance of the wireless processor 103 to be matched with is about 50Ω.

The wireless processor 103 performs wireless signal processing, such as modulation or demodulation, on a data communication signal to be transmitted, or received by the cellular system through the antenna 101, in accordance with an instruction from the controller 107.

Through the antenna 104, the wireless LAN system transmits and receives data communication (wireless LAN communication) signals.

The matching circuit 105 is connected to the antenna 104 and wireless processor 106. The matching circuit 105 matches the impedance of the antenna 104 with the circuit impedance of the wireless processor 106, for example, in the 2.4 GHz band, which is a frequency band for wireless LAN communications. Typically, the circuit impedance of the wireless processor 106 to be matched with is about 50Ω.

The wireless processor 106 performs wireless signal processing, such as modulation/demodulation, transmission, or reception, on a data communication signal to be transmitted, or received by the wireless LAN system through the antenna 104, in accordance with an instruction from the controller 107.

The controller 107 controls wireless signal processing performed by the wireless processor 103 of the cellular system and the wireless processor 106 of the wireless LAN system and audio signal processing performed by a microphone, a speaker, or the like. The controller 107 also controls the display screen of a display device, such as a display. The controller 107 also controls the operation input of the user of the wireless mobile device 100.

The controller 107 includes, for example, a detector 171 and a transmission controller 172.

The detector 171 detects the state in which the user is using the wireless mobile device 100 during data communication. Specifically, the detector 171 determines whether the wireless mobile device 100 is brought close to the mouth or head of the user. Hereafter, the state in which the wireless mobile device 100 is brought close to the mouth or head of the user may be referred to as the "close-to-head state." The "close-to-head state" is a state to which the mouth-worm criterion is applied.

The transmission controller 172 determines whether a communication (call) performed by the wireless mobile device 100 is a cellular communication or wireless LAN communication.

Due to the use form detection process and the used wireless system determination process, the transmission controller 172 determines whether a wireless LAN communication and a cellular communication have occurred simultaneously in the close-to-head state, in which the wireless mobile device 100 is brought close to the mouth or head of the user.

If it determines that a wireless LAN communication and a cellular communication have occurred simultaneously (at the same time) in the close-to-head state, the transmission controller 172 reduces the transmission power with which the wireless processor 106 of the wireless LAN system having a lower priority outputs signals. For example, if it determines that a wireless LAN communication and a cellular communication have occurred simultaneously in the close-to-head state, the transmission controller 172 causes the wireless LAN system having a lower priority to stop transmission. That is, the transmission controller 172 causes the wireless processor 106 to stop transmitting signals.

On the other hand, if it determines that a wireless LAN communication and a cellular communication have occurred simultaneously in the close-to-head state, the transmission controller 172 causes the wireless LAN system having a lower priority to continue receiving signals.

Operation of Wireless Mobile Device 100

Next, a transmission method performed by the wireless mobile device 100 will be described in detail.

Figure 3:
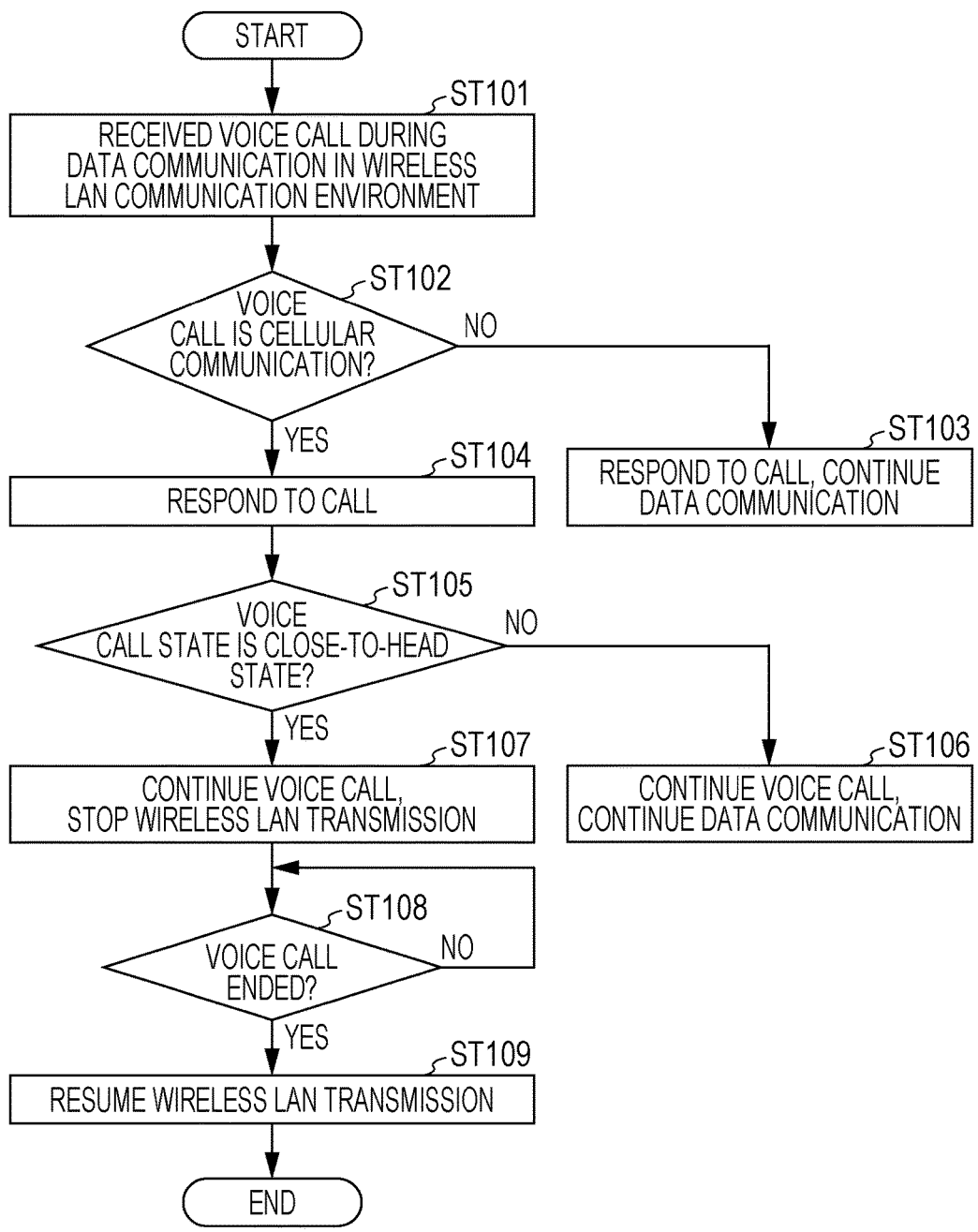
FIG. 3 is a flowchart showing the operation of the wireless mobile device according to the first embodiment.

FIG. 3 is a flowchart showing the operation of the wireless mobile device 100 according to the present embodiment.

Note that a process shown in FIG. 3 is started in a state in which the wireless mobile device 100 is performing a data communication in a wireless LAN communication environment.

The wireless LAN communication here is, for example, a multicast communication, such as video distribution (the reception of video data).

In step (hereafter referred to as "ST") 101 of FIG. 3, the controller 107 detects that the wireless mobile device 100 has received a voice call.

In ST102, the controller 107 determines whether the voice call is a cellular communication. For example, the controller 107 may determine that the voice call is a cellular communication, in the following cases: when a phone call reception screen is displayed on the display device; and when a call is received from a phone number registered in an address book referred to by the wireless mobile device 100, a mobile phone number starting from "090," "080," "070," or the like, an area code starting from "0," or the like, or a call is made to such a number.

Note that the method for determining whether the voice call is a cellular communication is not limited to those described above.

If the voice call is not a cellular communication (ST102: NO), that is, it is a wireless LAN communication, the controller 107 responds to the received voice call in ST103. Examples of a voice call using a wireless LAN communication include a voice call using over-the-top (OTT). The controller 107 also causes the wireless system to continue the data communication in the wireless LAN communication environment.

If the voice call is a cellular communication (ST102: YES), the controller 107 responds to the received voice call in ST104.

In ST105, the controller 107 determines whether the state in which the user is taking the voice call using the wireless mobile device 100 is the close-to-head state, in which the wireless mobile device 100 is brought close to the mouth or head of the user. In other words, the controller 107 determines whether the mouth-worn criterion should be applied as a criterion for evaluating the SAR during the voice call. The controller 107 may determine that the state is the close-to-head state, for example, when the user is taking the call using a microphone of the wireless mobile device 100 (e.g., when the microphone is on). The controller 107 may also determine that the state is not the close-to-head state, when the user is taking the call using an external device such as a headset, which is not the wireless mobile device 100. Note that the method for determining whether the state is the close-to-head state is not limited to those described above.

If the state in which the user is taking the voice call is not the close-to-head state (ST105: NO), the controller 107, in ST106, causes the cellular system and wireless LAN system to continue the voice call and the data communication, respectively.

In other words, if the wireless mobile device 100 is simultaneously performing a wireless LAN communication and a cellular communication in a state which is not the close-to-head state, the mouth-worn criterion is not applied. Accordingly, the wireless mobile device 100 causes the cellular system and wireless LAN system to simultaneously perform transmission.

If the state in which the user is taking the voice call is the close-to-head state (ST105: YES), the controller 107, in ST107, causes the cellular system to continue the voice call and causes the wireless LAN system to stop transmission. Note that the controller 107 causes the wireless LAN system to continue reception.

In ST108, the controller 107 determines whether the voice call has ended (has been hung up). If the voice call has not ended (ST108: NO), the controller 107 repeats ST108. If the voice call has ended (ST108: YES), the controller 107 causes the wireless LAN system to resume transmission stopped in ST107.

As seen above, in the present embodiment, when a wireless LAN communication and a cellular communication are performed simultaneously in the close-to-head state, the wireless mobile device 100 causes the cellular system having a higher priority to continue the cellular communication and causes the wireless LAN system having a lower priority to stop transmission. That is, when the state is the close-to-head state, that is, when the mouth-worn criterion is applied, the wireless mobile device 100 causes the cellular system and wireless LAN system to simultaneously perform the cellular communication and the wireless LAN communication, respectively, but avoids these systems from simultaneously performing transmission.

As seen above, when a wireless LAN communication and a cellular communication occur simultaneously in the close-to-head state, the wireless mobile device 100 causes the wireless LAN system having a lower priority to stop transmission. Thus, the wireless mobile device 100 can avoid the multiple wireless systems from simultaneously performing transmission and can cause only the cellular system having a higher priority to perform transmission. Accordingly, only the cellular system, which is performing transmission, is evaluated for the SAR. Further, the wireless mobile device 100 can cause the cellular system having a higher priority to perform transmission without reducing the transmission power and thus can avoid a reduction in the quality of the cellular communication.

As a result, when performing a communication with the device brought close to the mouth or head of the user, the wireless mobile device 100 of the present embodiment can improve the SAR characteristics without reducing the communication quality.

Further, when a cellular communication and a wireless LAN communication occur simultaneously in the close-to-head state, the wireless mobile device 100 of the present embodiment causes the wireless LAN system to stop transmission, but causes it to continue reception. Thus, for example, when a multicast communication, such as video distribution, described above is being performed as a wireless LAN communication, the wireless mobile device 100 can cause the wireless LAN system to continue receiving video data or the like. That is, the user who is receiving a video distribution service using the wireless mobile device 100 would not be affected by the stop of the transmission performed by the wireless LAN system.

While, in the present embodiment, priorities are assigned in accordance with the types (cellular system, wireless LAN system) of the wireless systems, the priorities may be assigned in accordance with the communication environments (e.g., communication quality) of the wireless systems. That is, a higher priority may be assigned to a wireless system having higher communication quality.

Second Embodiment

A wireless mobile device of the present embodiment has the same basic configuration as that of the wireless mobile device 100 of the first embodiment and therefore will be described with reference to FIG. 1.

Figure 4:
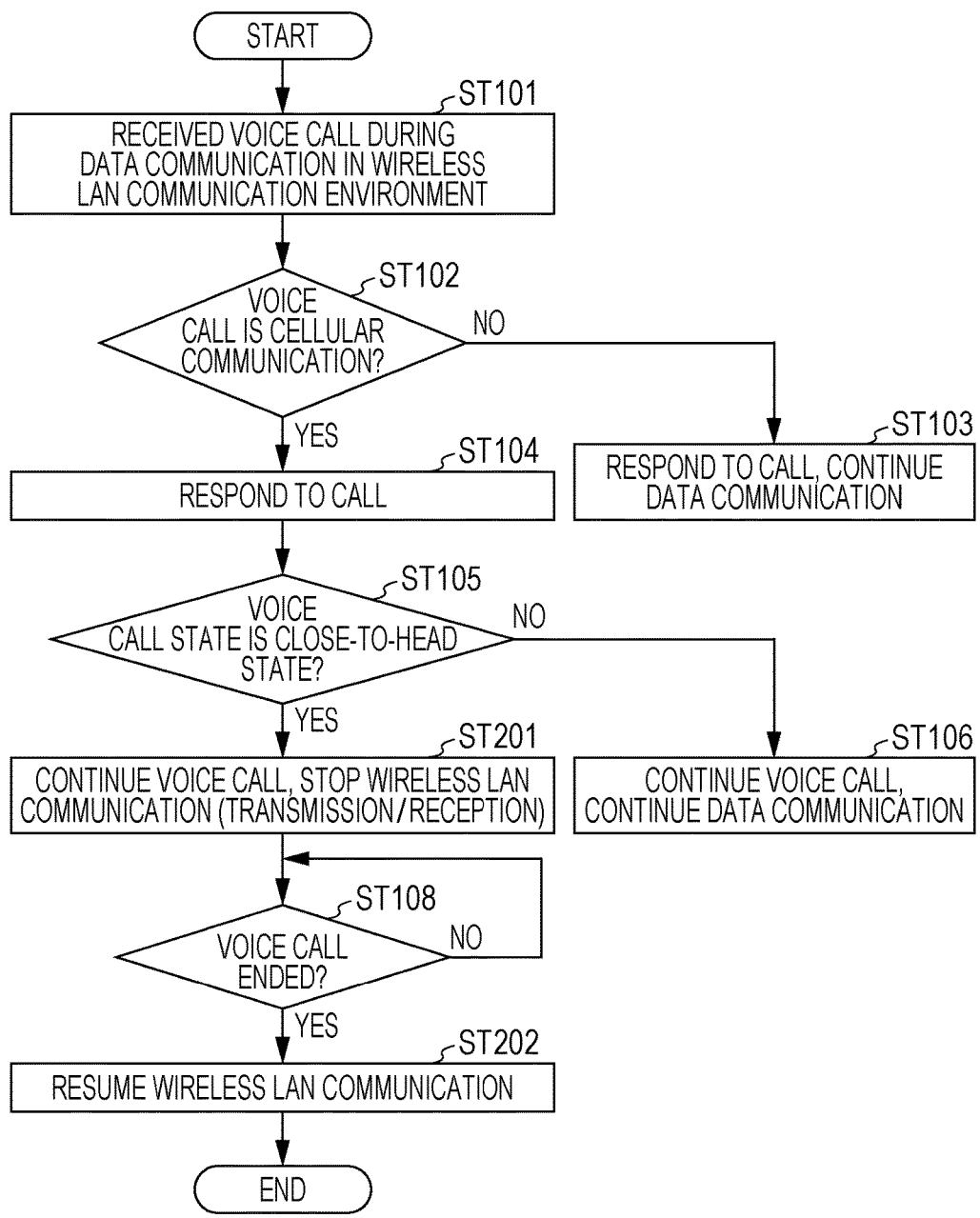
FIG. 4 is a flowchart showing the operation of a wireless mobile device according to a second embodiment.

FIG. 4 is a flowchart showing the operation of a wireless mobile device 100 according to the present embodiment. Note that steps similar to those in the first embodiment (FIG. 3) are given the same reference signs in FIG. 4 and will not be described.

An operation using a wireless LAN communication is, for example, browsing of a World Wide Web (Web) site.

In the present embodiment, there will be described a case in which the priority of a cellular system is higher than that of a wireless LAN system, as in the first embodiment.

If the state in which the user is taking a voice call is the close-to-head state (ST105: YES), a controller 107 of the wireless mobile device 100, in ST201, causes a cellular system to continue the voice call and causes a wireless LAN system to stop a communication. That is, in the present embodiment, the controller 107 causes the wireless LAN system to stop transmission and reception.

When the voice call ends (ST108: YES), the controller 107, in ST202, causes the wireless LAN system to resume the communication stopped in ST201.

As seen above, when a wireless LAN communication and a cellular communication are performed simultaneously in the close-to-head state, the wireless mobile device 100 of the present embodiment causes the cellular system having a higher priority to continue the communication and causes the wireless LAN system having a lower priority to temporarily stop the communication. That is, when the state is the close-to-head state, that is, when the mouth-worn criterion is applied, the wireless mobile device 100 causes only the cellular system to operate.

As seen above, if the cellular system performs a data communication in the close-to-head state while the wireless LAN system performs a data communication, the wireless mobile device 100 causes the wireless LAN system having a lower priority to stop transmission and reception. Thus, the wireless mobile device 100 can avoid the multiple wireless systems from simultaneously performing transmission and can cause only the cellular system having a higher priority to perform transmission. Accordingly, only the cellular system, which is performing transmission, is evaluated for the SAR. Further, the wireless mobile device 100 can cause the cellular system having a higher priority to perform transmission without reducing the transmission power and thus can avoid a reduction in the quality of a cellular communication.

As a result, as with the first embodiment, when performing a communication with the device brought close to the mouth or head of the user, the wireless mobile device 100 of the present embodiment can improve the SAR characteristics without reducing the communication quality.

In taking a voice call in the close-to-head state, the user locates a speaker of the wireless mobile device 100, for example, near his or her ears and locates a microphone thereof, for example, near his or her mouth. In this case, the user has difficulty in viewing a display device of the wireless mobile device 100 to perform browsing of a Web site which has been performed using a wireless LAN communication while taking the voice call. For this reason, when a voice call and browsing of a Web site occur simultaneously and when the voice call is preferentially performed and the browsing of the Web site is stopped, the user would not be affected.

While, in the present embodiment, priorities are assigned in accordance with the types of the wireless systems (cellular system, wireless LAN system), priorities may be assigned in accordance with the communication environments (e.g., the communication quality) of the wireless systems. That is, a higher priority may be assigned to a wireless system having higher communication quality.

Modification of Second Embodiment

In a modification of the second embodiment, there will be described a case in which a cellular system uses the unused antenna of a wireless LAN system which is stopping transmission and reception.

Figure 5:
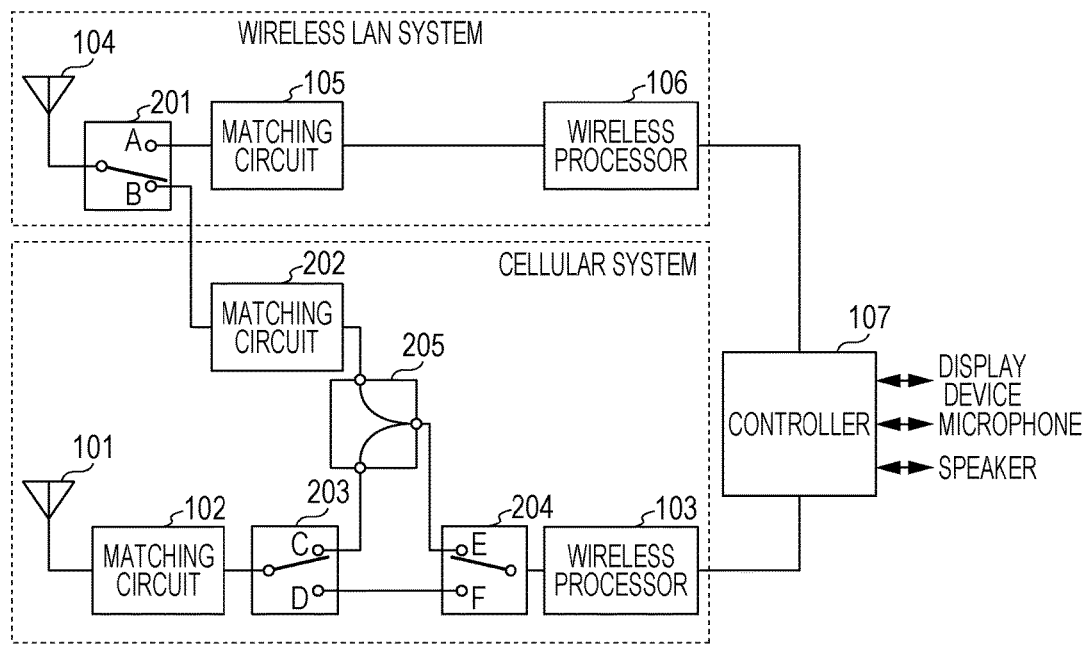
FIG. 5 is a block diagram showing an example configuration of a wireless mobile device according to a modification of the second embodiment.

FIG. 5 is a block diagram showing an example configuration of a wireless mobile device 200 according to the present modification. Note that elements that operate in the same manners as do those of the wireless mobile device 100 shown in FIG. 1 are assigned the same reference signs in FIG. 5 and will not be described.

Specifically, the wireless mobile device 200 includes the elements of the wireless mobile device 100, as well as a switch 201, a matching circuit 202, a switch 203, a switch 204, and a division/combination unit 205.

One terminal of the switch 201 is connected to the antenna 104, and the other terminals (terminals A, B) are connected to the matching circuit 105 or matching circuit 202. The switch 201 connects the one terminal to the terminal A or terminal B on the basis of an instruction (not shown) from the controller 107.

The matching circuit 202 is connected to the antenna 104 and division/combination unit 205. The matching circuit 202 matches the impedance of the antenna 104 with the circuit impedance of the wireless processor 103, for example, in the 2 GHz band, which is a frequency band for cellular communications. Typically, the circuit impedance of the wireless processor 103 to be matched with is about 50Ω.

One terminal of the switch 203 is connected to the antenna 101, and the other terminals (terminals C, D) are connected to the matching circuit 204 or division/combination unit 205. The switch 203 connects the one terminal to the terminal C or terminal D on the basis of an instruction (not shown) from the controller 107.

One terminal of the switch 204 is connected to the wireless processor 103, and the other terminals (terminals E, F) are connected to the matching circuit 203 or division/combination unit 205. The switch 204 connects the one terminal to the terminal E or terminal F on the basis of an instruction (not shown) from the controller 107.

The division/combination unit 205 divides a cellular communication data signal (high-frequency signal) received from the wireless processor 103 and transmits the divided signals to the cellular communication antenna 101 and the wireless LAN communication antenna 104.

Figure 6:
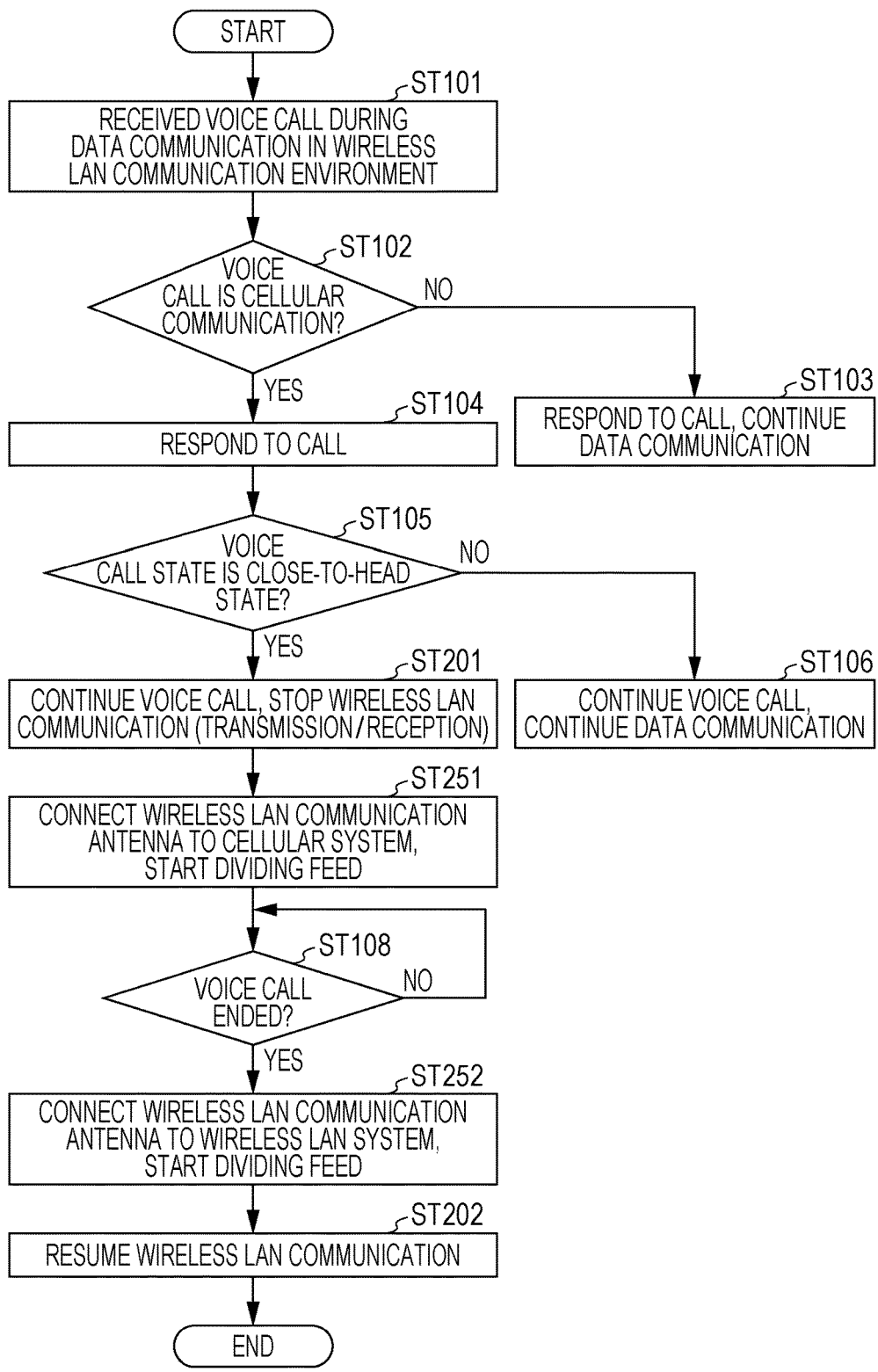
FIG. 6 is a flowchart showing the operation of the wireless mobile device according to the modification of the second embodiment.

FIG. 6 is a flowchart showing the operation of the wireless mobile device 200 according to the present modification. Note that steps similar to those in the second embodiment (FIG. 4) are given the same reference signs in FIG. 6 and will not be described.

When the wireless LAN communication is stopped in ST201, the controller 107 of the wireless mobile device 200, in ST251, connects the wireless LAN antenna 104 to the cellular system and causes the division/combination unit 205 to start dividing feed.

Specifically, in FIG. 5, the one terminal of the switch 201 is normally connected to the terminal A. Accordingly, the antenna 104 is connected to the wireless processor 106 for wireless LAN communication through the matching circuit 105. Also, in FIG. 5, the one terminal of the switch 203 is normally connected to the terminal D, and the one terminal of the switch 204 is normally connected to the terminal F.

Accordingly, the antenna 101 is connected to the wireless processor 103 for cellular communication through the matching circuit 102.

On the other hand, in ST251, the one terminal of the switch 201 is connected to the terminal B and thus the antenna 104 is connected to the wireless processor 103 through the matching circuit 202 and division/combination unit 205.

Also, in ST251, the one terminal of the switch 203 is connected to the terminal C, and the one terminal of the switch 204 is connected to the terminal E. Thus, the antenna 101 is connected to the wireless processor 103 through the matching circuit 102 and division/combination unit 205.

Thus, a transmission signal of the cellular system outputted from the wireless processor 103 is divided, and the divided signals are transmitted to the antenna 101 of the cellular system and the antenna 104 of the wireless LAN system.

When the voice call ends (ST108: YES), the controller 107, in ST252, connects the wireless LAN antenna 104 to the wireless LAN system to stop the dividing feed. That is, in FIG. 5, the one terminal of the switch 201 is connected to the terminal A; the one terminal of the switch 203 is connected to the terminal D; and the one terminal of the switch 204 is connected to the terminal F.

The controller 107 then causes the wireless LAN system to resume the communication stopped in ST201 (ST202).

As seen above, when a wireless LAN communication and a cellular communication simultaneously occur in the close-to-head state, a data signal outputted from the wireless processor 103 is divided by the division/combination unit 205, and the divided signals are transmitted to the antenna 101 of the cellular system and the antenna 104 of the wireless LAN system whose communication has been stopped. That is, the cellular communication high-frequency signal is divided, and the divided signals are transmitted to the two antennas. Thus, the current distribution density of each antenna is reduced, and the SAR is reduced. As seen above, according to the present modification, it is possible to improve SAR characteristics while improving the quality of voice calls performed by the cellular system.

Third Embodiment

A wireless mobile device of the present embodiment has the same basic configuration as that of the wireless mobile device 100 of the second embodiment and therefore will be described with reference to FIG. 1.

Figure 7:
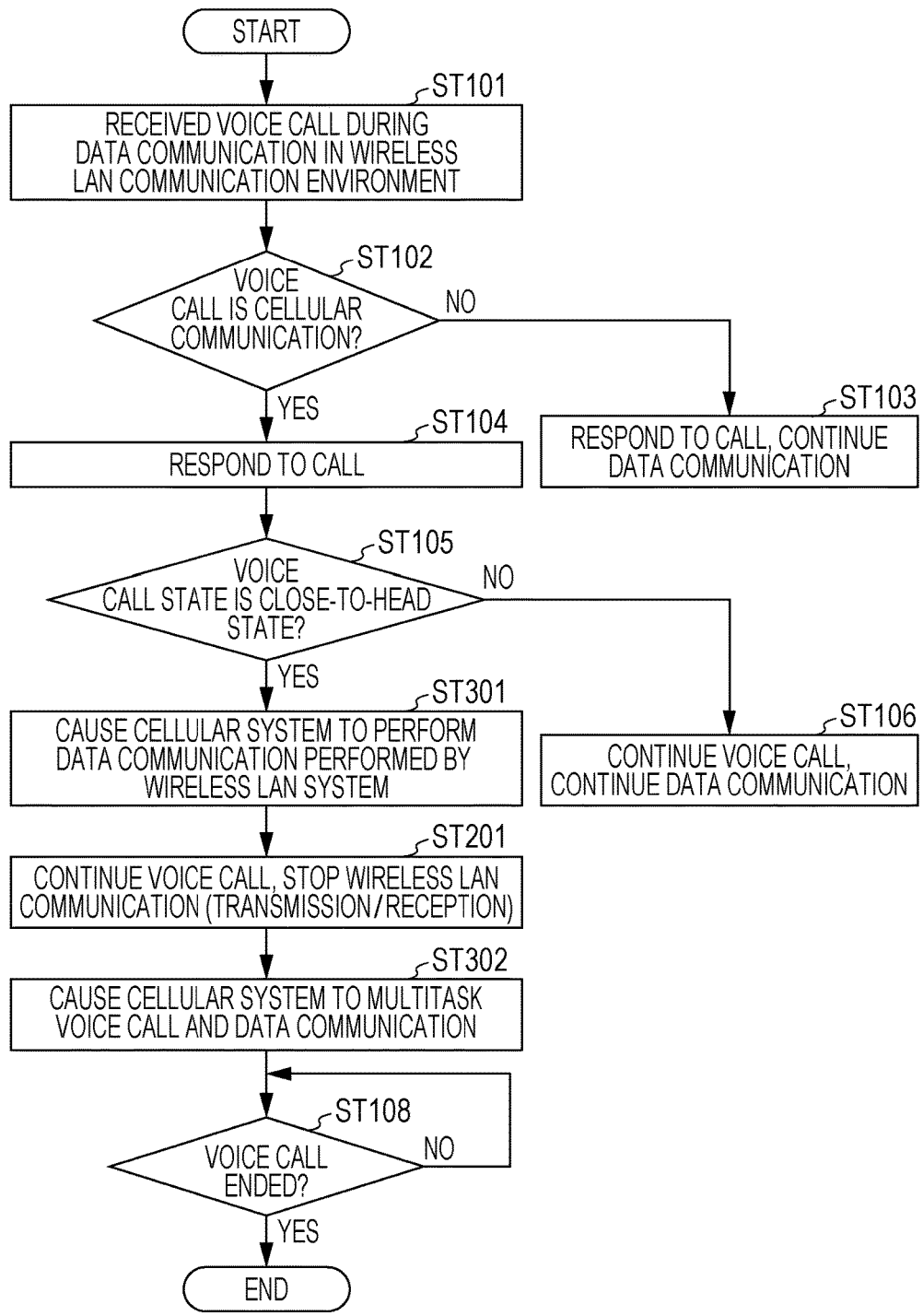
FIG. 7 is a flowchart showing the operation of a wireless mobile device according to a third embodiment.

FIG. 7 is a flowchart showing the operation of a wireless mobile device 100 according to the present embodiment. Note that steps similar to those in the second embodiment (FIG. 4) are given the same reference signs in FIG. 7 and will not be described.

In the present embodiment, an operation using a wireless LAN communication is, for example, a download of data from a Web site.

In the present embodiment, as in the first embodiment, there will be described a case in which the priority of a cellular system is higher than that of a wireless LAN system.

In FIG. 7, if it is determined that the state in which the user is taking a voice call is the close-to-head state (ST105: YES), a controller 107 of the wireless mobile device 100, in ST301, causes the cellular system to perform a data communication that has been performed by the wireless LAN system.

In ST201, the controller 107 causes the wireless LAN system to stop the data communication. In ST302, the controller 107 causes the cellular system to multitask the voice call and the data communication.

As seen above, when a wireless LAN communication and a cellular communication occur simultaneously in the close-to-head state, the wireless mobile device 100 causes the cellular system to perform the data communication that has been performed by the wireless LAN system.

Thus, the wireless mobile device 100 can avoid the multiple wireless systems from simultaneously performing transmission and can cause only the cellular system having a higher priority to perform transmission. As a result, as in the second embodiment, only the cellular system, which is performing transmission, is evaluated for the SAR. Further, the wireless mobile device 100 can cause the cellular system having a higher priority to perform transmission without reducing the transmission power and thus can avoid a reduction in the quality of the cellular communication.

When a voice call is received in the close-to-head state, the wireless mobile device 100 causes the wireless LAN system to stop the data communication in order to improve the SAR characteristics and causes the cellular system to perform the data communication that has been performed by the wireless LAN system. Thus, the wireless mobile device 100 can continue the data communication that has been performed by the wireless LAN system.

As seen above, according to the present embodiment, the cellular system is caused to multitask the voice call and data communication. Thus, it is possible to improve the SAR characteristics without reducing the communication quality of the voice call performed by the cellular system while simultaneously performing the voice call and data communication.

When the voice call ends (ST108 shown in FIG. 7: YES), the wireless mobile device 100 may cause the cellular system to continue performing the data communication, or may cause the wireless LAN system to again perform the data communication. For example, if the cellular communication environment after the voice call is hung up is stable, the wireless mobile device 100 may cause the cellular system to continue performing the data communication; if the wireless LAN communication environment is stable, the wireless mobile device 100 may cause the wireless LAN system to resume the data communication.

While, in the present embodiment, priorities are assigned in accordance with the types of the wireless systems (cellular system, wireless LAN system), priorities may be assigned in accordance with the communication environments (e.g., the communication quality) of the wireless systems. That is, a higher priority may be assigned to a wireless system having higher communication quality.

Fourth Embodiment

A wireless mobile device of the present embodiment has the same basic configuration as that of the wireless mobile device 100 of the second embodiment and therefore will be described with reference to FIG. 1.

In the first to third embodiments, priorities are previously assigned to the wireless systems. In the present embodiment, on the other hand, the user of the wireless mobile device 100 selects a wireless system to be used and thus priorities are assigned to the wireless systems.

FIG. 8 is a flowchart showing the operation of a wireless mobile device 100 according to the present embodiment. Note that steps similar to those in the second embodiment (FIG. 4) are given the same reference signs in FIG. 8 and will not be described.

In the present embodiment, an operation using a wireless LAN communication is, for example, a download of data from a Web site.

Also, in the present embodiment, it is assumed that the wireless mobile device 100 supports an OTT voice call service (e.g., a Voice over Internet Protocol (VoIP) service) which uses a wireless LAN system.

In FIG. 8, if a controller 107 of the wireless mobile device 100 determines that the state in which the user is taking a voice call is the close-to-head state (ST105: YES), it displays in ST401, on a display device, information urging the user to make a selection as to whether a wireless LAN system should be caused to perform the voice call being performed by a cellular system. The user makes a selection as to which of the cellular system and wireless LAN system should be caused to perform the voice call, on the basis of information displayed on the display device. Information indicating a wireless system selected by the user is outputted to the controller 107 (not shown).

In ST402, the controller 107 determines which of the cellular system and wireless LAN system the user has selected to perform the voice call.

If the user has selected the wireless LAN system (ST402: wireless LAN communication), the controller 107 causes the display screen of the terminal of the other end to display information indicating that the change of the wireless system which performs the voice call is being requested by the wireless mobile device 100 (ST403). Then, as with the wireless mobile device 100 (ST401, ST402), the terminal of the other end displays, on the display device thereof, information urging the other end to make a selection as to whether a wireless LAN system should be caused to perform the voice call being performed by a cellular system. Then, the other end makes a selection as to which of the cellular system and wireless LAN system should perform the voice call, on the basis of the information displayed on the display device. Then, information indicating the wireless system selected by the terminal of the other end is transmitted to the wireless mobile device 100.

In ST404, the controller 107 determines which of the cellular system and wireless LAN system the other end has selected to perform the voice call, on the basis of the information transmitted from the terminal of the other end.

If the user and the other end have each selected the cellular system in ST402 and ST404 (ST402, ST404: cellular system), the controller 107, in ST405, causes the cellular system to multitask the voice call and data communication, as described in the third embodiment. ST405 is similar to ST301, ST201, ST302, and ST108 shown in FIG. 7.

On the other hand, if the other end has selected the wireless LAN system (ST404: wireless LAN system), the controller 107, in ST406, causes the cellular system to stop the voice call.

That is, the user of the wireless mobile device 100 and the other end assign priorities to the wireless systems by selecting a wireless system. For example, in FIG. 8, if the user of the wireless mobile device 100 and the other end each select the wireless LAN system, a higher priority than that of the cellular system is assigned to the wireless LAN system. On the other hand, in FIG. 8, if the user of the wireless mobile device 100 and the other end each select the cellular system, a higher priority than that of the wireless LAN system is assigned to the cellular system.

In ST407, the controller 107 causes the wireless LAN system (e.g., a VoIP service) to make a call to the terminal of the other end. The other end receives the call from the wireless mobile device 100 and responds to it (ST408).

In ST409, the controller 107 causes the wireless LAN system to multitask the voice call and data communication.

As seen above, when the cellular system performs a data communication (referred to as a data communication B) in the close-to-head state while the wireless LAN system performs a data communication (referred to as a data communication A), the wireless mobile device 100 causes the wireless system (the wireless system having a higher priority) selected by the user and the other end to perform the data communication A and data communication B.

That is, if the cellular system is selected, the wireless mobile device 100 causes the cellular system to perform the data communication A and data communication B, as in the third embodiment; if the wireless LAN system is selected, it causes the wireless LAN system to perform the data communication A and data communication B.

Thus, the wireless mobile device 100 can avoid the multiple wireless systems from simultaneously performing transmission and can cause only one wireless system selected by the user from the cellular system and wireless LAN system and having a higher priority to perform transmission. Accordingly, only the one wireless system, which is performing the communication, is evaluated for the SAR. Further, the wireless mobile device 100 can cause the wireless system having a higher priority to perform transmission without reducing the data communication transmission power and thus can avoid a reduction in the communication quality of the wireless system.

In FIG. 8, when the wireless LAN system is selected, the wireless mobile device 100 stops the cellular communication in order to improve the SAR characteristics and causes the wireless LAN system to perform the data communication which has been performed by the cellular system. Thus, the wireless mobile device 100 can continue the voice call that has been performed by the cellular system.

As seen above, according to the present embodiment, one wireless system having the highest priority of the multiple wireless systems multitasks the voice call and data communication. Thus, it is possible to improve the SAR characteristics without reducing the communication quality of the voice call performed by the wireless system while simultaneously performing the voice call and data communication.

In the present embodiment described above, priorities are assigned to the wireless systems on the basis of the selection (e.g., ST402, ST404 shown in FIG. 8) made by the user of the wireless mobile device 100 (or the other end). However, priorities may be assigned to the wireless systems in accordance with the communication environments (e.g., the communication quality) of the wireless systems. In this case, for example, instead of performing ST401 to ST404 shown in FIG. 8, the wireless mobile device 100 determines a wireless system having a higher priority, if the cellular system has a higher priority, it proceeds to ST405, and if the wireless LAN system has a higher priority, it proceeds to ST406 to ST409 (not shown).

At the time point when the wireless mobile device 100 receives the voice call, it may cause the wireless LAN system to perform the voice call, regardless of whether the state is the close-to-head state. In this case, before the user takes the voice call, the wireless mobile device 100 displays information urging the user to make a selection as to whether the wireless LAN system should be caused to perform the voice call. In this case, there is no need to perform ST105 in FIG. 8.

The embodiments of the present disclosure have been described above.

The wireless mobile device 100 or 200 shown in FIG. 1 or 5 may selectively perform the transmission methods of the embodiments in accordance with the situation in which the wireless mobile device is being used. For example, when a communication being performed by the wireless LAN system is mostly the reception of a video distribution service or the like, the wireless mobile device 100 may perform the transmission method of the first embodiment (causing the wireless LAN system to stop transmission). If a communication being performed by the wireless LAN system is a communication which is difficult to perform in the close-to-head state, such as browsing of a Web browser, the wireless mobile device 100 may perform the transmission method of the second embodiment (causing the wireless LAN system to stop transmission and reception). When a communication being performed by the wireless LAN system is a download of data from a Web site, or the like, the wireless mobile device 100 may perform the transmission method of the third or fourth embodiment (causing one wireless system to perform multitasking).

While, in the above embodiments, the wireless mobile device 100 includes the cellular system and wireless LAN system including the corresponding elements, the respective wireless systems may include other elements. While, the first to third embodiments, the priority of the cellular system is higher than that of the wireless LAN system, priorities may be assigned to the multiple wireless systems in other manners.

While, in the above embodiments, there has been described the transmission method when a voice call is received while a data communication is performed in a wireless LAN communication environment (e.g., FIGS. 3, 4, and 6 to 8), the wireless mobile device 100 may perform a similar transmission method even when a voice call is made while a data communication is performed in a wireless LAN communication environment.

While the example in which one aspect of the present disclosure is implemented as hardware has been described in the above embodiments, the present disclosure may be implemented as software in association with hardware.

Typically, the function blocks used to describe the embodiments are implemented in the form of an LSI, which is an integrated circuit. An integrated circuit may control the function blocks used to describe the embodiments and have input and output. The function blocks may be implemented as individual chips, or some or all thereof may be implemented as one chip. While the integrated circuit here is referred to as the LSI, it may be referred to as an IC, system LSI, super LSI, or ultra LSI depending on the degree of integration.

The method for forming an integrated circuit is not limited to LSI and may be to use a dedicated circuit or general-purpose processor. After manufacturing the LSI, a field programmable gate array (FPGA) may be used, or a reconfigurable processor, which can reconfigure the connection or setting of the circuit cells in the LSI, may be used.

If an integrated circuit technology which replaces LSI appears due to the progress of the semiconductor technology or due to a derived technology, the function blocks may be integrated using that technology, as a matter of course. Possible such technologies include bio technologies.

The one aspect of the present disclosure is suitable for wearable devices and the like.

What is claimed is:

1. A wireless mobile device that is used with the wireless mobile device on a wrist of a user, comprising:
   a first wireless processor which, in operation, performs wireless signal processing on a signal for a data communication in a first wireless system;
   a second wireless processor which, in operation performs wireless signal processing on a signal for a voice call in a second wireless system, the second wireless system having a higher priority than a priority of the first wireless system; and
   a controller which, in operation, causes the first wireless system to stop transmission and to continue reception when data reception is performed in the first wireless system and a voice call in the second wireless system occurs when the data reception is occurring in the first wireless system and the mobile device on the wrist of the user is in a close-to-head state in which the wireless mobile device is close to a head or a mouth of the user, causes a transmission signal of the second wireless system output from the second wireless processor to be divided into divided transmission signals and causes the divided transmission signals to be transmitted to a first antenna for the first wireless system and a second antenna for the second wireless system.

2. The wireless mobile device according to claim 1, wherein when the second wireless processor performs a voice call in the close-to-head state while the first wireless processor performs a data communication including both receiving and transmitting data for a display, the controller further causes the first wireless processor to stop reception.

3. The wireless mobile device according to claim 2, wherein when a data communication in the first wireless system and a voice call in the second wireless system occur at the same time and the wireless mobile device is in the close-to-head state, the controller causes the second wireless system to perform the data communication in the first wireless system.

4. The wireless mobile device according to claim 2, wherein when the first wireless system performs a second data communication in the close-to-head state while the second wireless system performs a first data communication, the controller causes the second wireless system to perform the first data communication and the second data communication.

5. The wireless mobile device according to claim 1, wherein
   the data reception performed in the first wireless system includes reception of video data.

6. The wireless mobile device according to claim 1, wherein
   the controller causes the first wireless processor to stop reception when the data communication performed in the first wireless system includes browsing Web site on the display.

7. A transmission method in a wireless mobile device that is used with the wireless mobile device on a wrist of a user, comprising:
   performing wireless signal processing on a signal for a data communication in a first wireless system;
   performing wireless signal processing on a signal for a voice call in a second wireless system, the second wireless system having a higher priority than a priority of the first wireless system;
   causing the first wireless system to stop transmission and to continue reception when data reception is performed in the first wireless system and a voice call in the second wireless system occurs when the data reception is occurring in the first wireless system and the mobile device on the wrist of the user is in a close-to-head state in which the wireless mobile device is close to a head or a mouth of the user;

dividing a transmission signal of the second wireless system output from the second wireless processor into divided transmission signals; and transmitting the divided transmission signals to a first antenna for the first wireless system and a second antenna for the second wireless system.

8. The method of claim 7, further comprising stopping reception by the first wireless system when the second wireless system performs a voice call in the close-to-head state while the first wireless system performs a data communication including both receiving and transmitting data for a display.

9. The method of claim 8, further comprising causing the second wireless system to perform the data communication in the first wireless system when a data communication in the first wireless system and a voice call in the second wireless system occur at the same time and the wireless mobile device is in the close-to-head state.

10. The method of claim 8, further comprising, when the first wireless system performs a second data communication in the close-to-head state while the second wireless system performs a first data communication, causing the second wireless system to perform the first data communication and the second data communication.

11. The method of claim 7, wherein the data reception performed in the first wireless system includes reception of video data.

12. The method of claim 7, further comprising causing first wireless system to stop reception when the data communication performed in the first wireless system includes browsing Web site on a display.

* * * * *